United States Patent [19]

Nabiullin et al.

[11] 4,136,443
[45] Jan. 30, 1979

[54] DEVICE FOR SEALING CURRENT SOURCES OF CYLINDRICAL SHAPE WITH ALKALI ELECTROLYTE

[76] Inventors: Faat K. Nabiullin, 3 Mytischinskaya ulitsa, 14A, kv. 90; Efim M. Gertsik, Malo-Moskovskaya ulitsa, 3, kv. 92; Vyacheslav A. Rabinovich, prospekt Mira, 122, kv. 270, all of Moscow; Vladimir A. Soldatenko, ulitsa Cheljuskintsev, 14, kv. 136, Novosibirsk; Jury T. Rodionov, prospekt Mira, 190A, kv. 71, Moscow, all of U.S.S.R.

[21] Appl. No.: 682,388

[22] Filed: May 3, 1976

[51] Int. Cl.² ............................................. H01M 2/04
[52] U.S. Cl. ................................... 29/731; 29/623.2; 53/366; 53/488
[58] Field of Search .................... 29/623.2, 623.1, 731, 29/730, 511; 429/172, 174; 53/40, 42, 366, 329

[56] References Cited
U.S. PATENT DOCUMENTS

| | | | |
|---|---|---|---|
| 1,862,981 | 6/1932 | Rabezzana | 29/511 X |
| 3,221,403 | 12/1965 | Simonton | 29/730 X |
| 3,349,543 | 10/1967 | Carmichael et al. | 53/366 |
| 3,802,050 | 4/1974 | Verhoest | 29/511 X |
| 4,008,357 | 2/1977 | Nishimura et al. | 429/218 |

*Primary Examiner*—Carl E. Hall
*Attorney, Agent, or Firm*—Lackenbach, Lilling & Siegel

[57] ABSTRACT

The present invention relates to current sources and, in particular, to a method for sealing current sources, preferably of a cylindrical shape, with an alkali electrolyte and to devices for carrying same into effect.

The method can be realized by a device, comprising a rolling die, a hold-down member adapted to position the plane of the cell cover end face perpendicular to the cell axis and to press said cover towards the cell's central support, a footstep for positioning said cell support during sealing. According to the invention, said footstep is made as a cylindrical socket with a ring projection, or has a shape similar to that of the supporting part of the cell being rolled. The rolling die comprises at least one cone-shaped section and is provided with a stop adapted to limit the motion of the hold-down member into the die.

8 Claims, 8 Drawing Figures

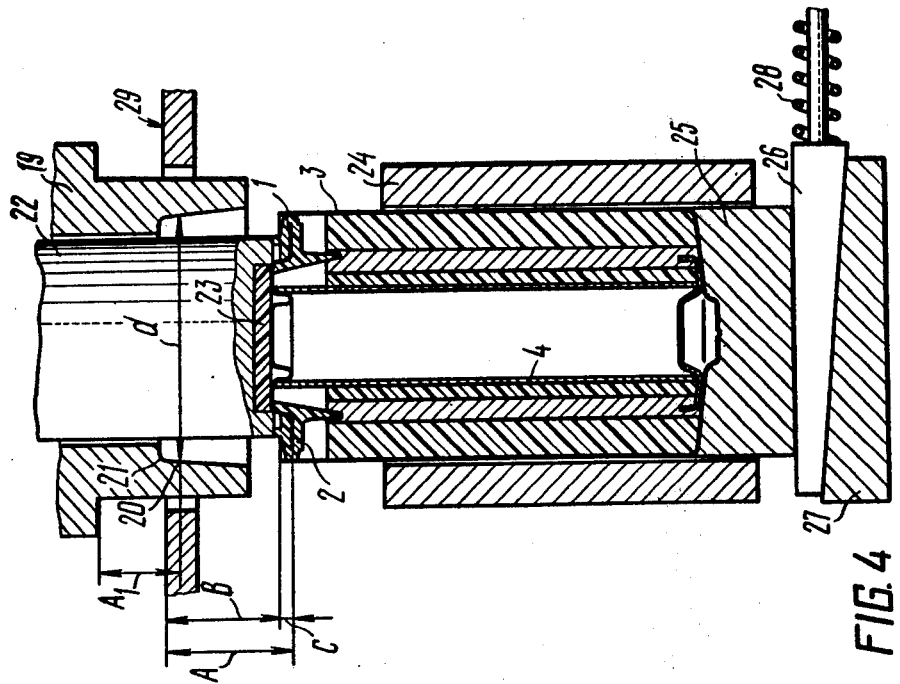
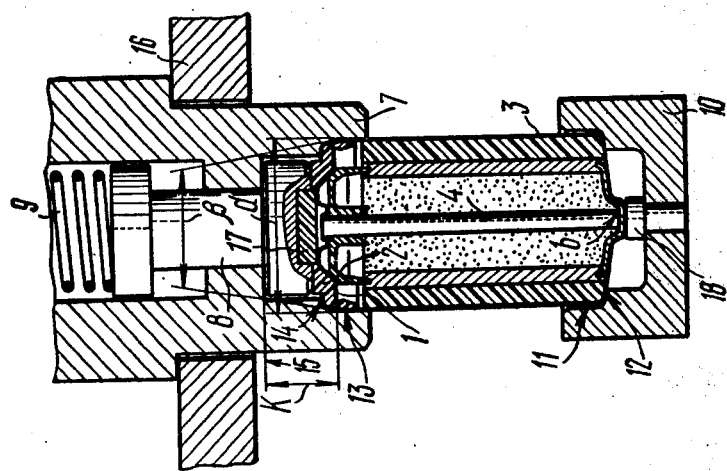
FIG. 4
FIG. 3

DEVICE FOR SEALING CURRENT SOURCES OF CYLINDRICAL SHAPE WITH ALKALI ELECTROLYTE

The present invention relates to methods of, and devices for manufacturing current sources; in particular to a, it relates method for, sealing a current source, preferably of a cylindrical shape, with an alkali electrolyte and to devices for carrying same into effect.

Sealing alkali electrolyte current sources is a complicated problem due to the necessity of preventing the alkali solution, such as KOH, which possesses a high fluidity, from leaking out from the jar of a cell closed with a metal cover and provided with an insulation gasket fitted therebetween.

Having prevented the leakage of the alkali from the cell, it is now necessary to allow the escape of hydrogen evolved in the cell as a result of zinc corrosion. In the known alkali cells of a zinc-manganese system, to reduce the fluidity of the alkali solution the latter is thickened by adding potato starch, flour or other thickening agents to the solution. However, in the majority of cases this does not prevent the alkali from leaking out through poorly sealed spots; conversely, in the case of tight sealing (rolling) the escape of gases from the cell jar is stopped which may result in its deformation and in failure of the whole cell.

Known in the prior art is a method for sealing current sources by holding a sealing insulation gasket between the cell jar and the cell cover (cf. V. N. Damye and N. F. Rysukhin, "Production of Voltaic Cells and Batteries", 1970, p.p. 240-246 and 296-298 /in Russian/).

The device, according to the known method for sealing, comprises a shaped rolling member with a spring-loaded hold-down, which is adapted for positioning the cell cover perpendicular to the body axis and for pressing it to the support, and a sleeve which is adapted to accommodate the cell jar together with a footstep shaped to suit the shape of the cell jar bottom.

To provide the required uniform compression of the sealing gasket by using the known method and devices, it is necessary to provide a very high production accuracy of the component parts of the current source to be sealed which is practically unattainable under mass production conditions which should provide a low cost price of production items.

Therefore, in manufacturing current sources, each cell is the subject of a check for sealing quality taking into consideration the initial dimensions of component parts and their measurement results obtained after sealing.

Moreover, the magnified image of the current source sealing unit showing the configuration of its rolled profile is projected onto a reference pattern to bring them into coincidence.

All this involves considerable difficulties in the production and fails to fully warrant an adequate quality of sealing.

To seal current sources with the use of the known devices it is also necessary to subject the rolled part of the cell jar to heat treatment, that is, annealing so as to remove cold deformation resulting from the production of the jar by the press working method.

The necessity of annealing the cell jar involves additional labor consumption.

It is an object of the present invention to provide a method for insuring a quality and stable sealing of current sources irrespective of the size allowances of the current source component parts.

It is another object of the present invention to provide some devices for effecting the method for sealing current sources both with rod- and tube-type supports.

It is still another object of the present invention to provide a method of for sealing cells whose jars have not been subjected to heat treatment, i.e., annealing.

The objects set forth are accomplished by a method for sealing current sources, preferably of a cylindrical shape with an alkali electrolyte, consisting of holding a sealing insulation gasket between the jar and the cover of a cell, positioning the plane containing the end face of said cell cover with reference to the rolling die at a distance equivalent to that reached by the plane containing the sealing section of the rolling punch at the end of the working stroke thereof, and changing the position of at least one of the bearing points of the central support, i.e., changing the position of the cell jar bottom or cell jar cover is effected by moving them along the cell axis, thus bringing the plane containing the end face of the cover in coincidence with the sealing section of the rolling die and fixing the cell cover in this position by the rolled edge of the cell jar.

Such an embodiment of the method provides a stable holding of the sealing gasket, prevents the electrolyte from leaking out of the cell jar and ensures the escape of hydrogen during cell storage resulting from zinc corrosion.

This method can be realized in a device comprising a shaped rolling die, a hold-down member adapted to position the plane of the cell cover end face perpendicular to the cell axis and to press said cover towards the central support, and a footstep for positioning the cell support in the sealing process. According to the invention, the footstep is made as a cylindrical socket having a ring projection. The rolling die has a cone-shaped portion with an angle at the cone vertex of about 10±5° and comprises a stop for limiting the motion of the holddown member into the die.

Such an embodiment of the device provides an automatic displacement (deflection) of at least one of the bearing points of the central support i.e., bottom or cover, or both over a required length. As a result, the plane containing the cover end face comes into coincidence with the die sealing diameter, the sealing gasket is pressed in between the jar and the cover to the required extent, and the jar edge is rolled, whereby the cover is fixed in position.

At the same time a reliable springy contact is provided between the support, which is at the same time a current leadout, and the cover.

To limit the amount of deflection of the cell bottom and the displacement of the opposite bearing point over a required length, the footstep can comprise a stop disposed at the center thereof.

To seal current sources having a tube-type current leadout, according to the method of the present invention, it is also advisable to make use of a device comprising a rolling die, a hold-down member and a footstep having a shape similar to that of the lower part of the current source being rolled. According to the invention, said footstep comprises a mechanism for traversing along the axis of the device as far as the cover of the cell being rolled thrusts against the stationary hold-down member. The rolling die comprises a cone-shaped portion with an angle at the cone vertex of about 10±5° and a stop limiting the die movement.

Such an embodiment of the device also provides the coincidence of the cover end face with the die sealing diameter, a required squeezing of the sealing gasket between the cell jar and cover, and fixing the cover in a required position with reference to the jar with the help of the rolled edge of the latter.

In this case it is advisable to make a footstep traversing mechanism in the form of a spring- or air-actuated wedge.

To provide a quality sealing of the current sources whose jars have not been subjected to heat treatment, i.e., annealing, it is necessary to build up the rolling die so it comprises coaxially disposed outer and inner dies, the outer die including two cone-shaped portions, one of which having an angle at the cone vertex of about $10\pm5°$ and being located at the die face behind its starting portion, the other one having an angle at the cone vertex of about $60\pm5°$ and being located adjacent to the former one, the inner die to be provided with a cone-shaped portion having an angle at the cone vertex of about $140\pm10°$.

To simplify the die actuating mechanism, said die is preferable interconnected by an elastic shock-absorbing damper.

The invention will now be described in greater detail with reference to a specific embodiment thereof, to be taken in conjunction with the accompanying drawings, wherein:

FIG. 3 is a cross sectional view of the device of FIG. 2, showing a support at the footstep center;

FIG. 4 is a cross sectional view of a device for sealing current sources comprising, according to the invention, a mechanism for traversing the footstep along the axis thereof;

Figure 2:
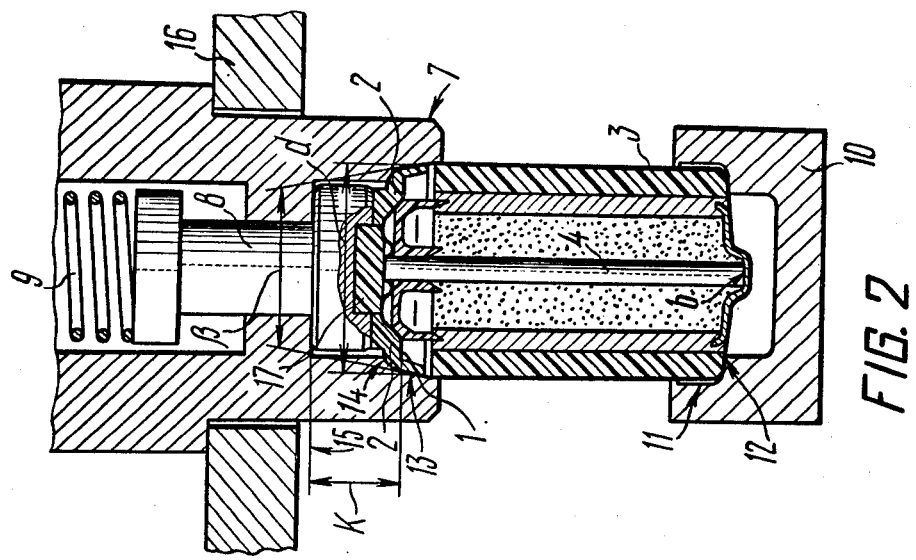
FIG. 2 is a cross-sectional view of a device for sealing current sources, according to the invention, showing a rod-type support of the cover.

The method for sealing current sources is as follows.

A cover 1 (FIG. 1) of a current source (a cell) fitted into a sealing gasket 2 with an interference or cast integral therewith is put onto a cell jar 3, the central part thereof being pressed to a current leadout 4. The cover 1 pressed to the current leadout 4 is positioned at the required distance "a" from a positive stop 5 which limits the stroke of a rolling die 6, i.e., the plane of the end face of the cover being set at the required distance "a" from the stop 5 of the rolling die 6, said distance being equal for all similar-type cells being rolled. The cover 1 can be set either by way of deforming (deflecting) the bottom of the jar 3, the body cylindrical portion remaining in a fixed position, or by way of displacing the entire jar 3 along its axis over the required distance, or else by combining the two ways mentioned hereinabove.

Figure 1:
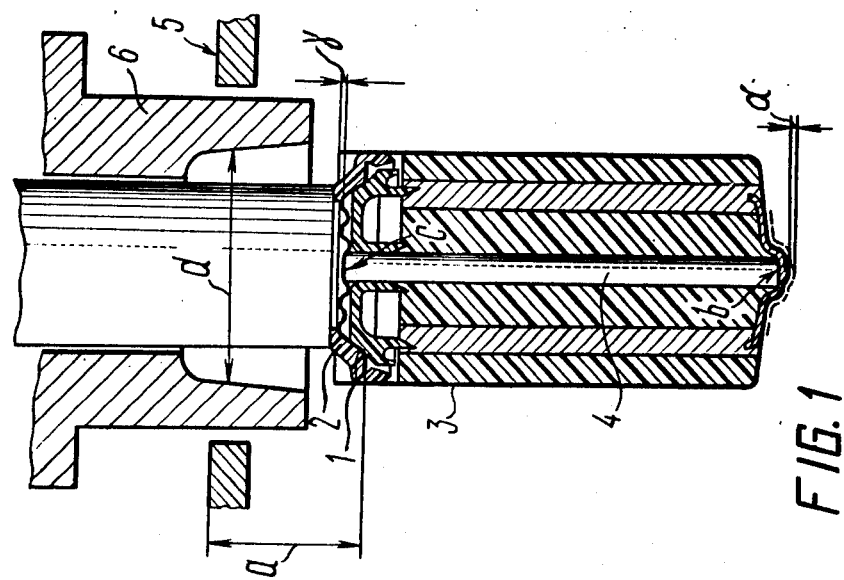
FIG. 1 is a cross sectional view of the device for realizing a method for sealing current sources, according to the invention.
Figure 6:
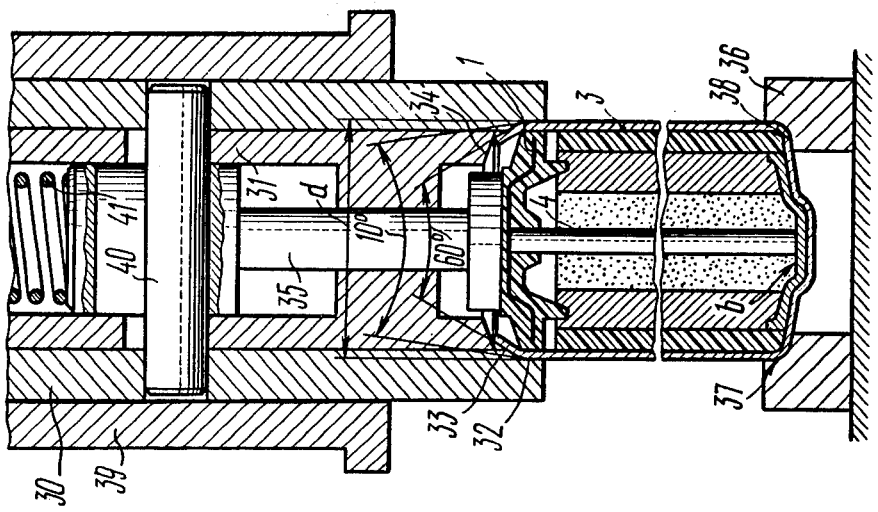
FIG. 6 is a cross sectional view of the showing device of FIG. 5 the presealing of the cell by the outer die.
Figure 5:
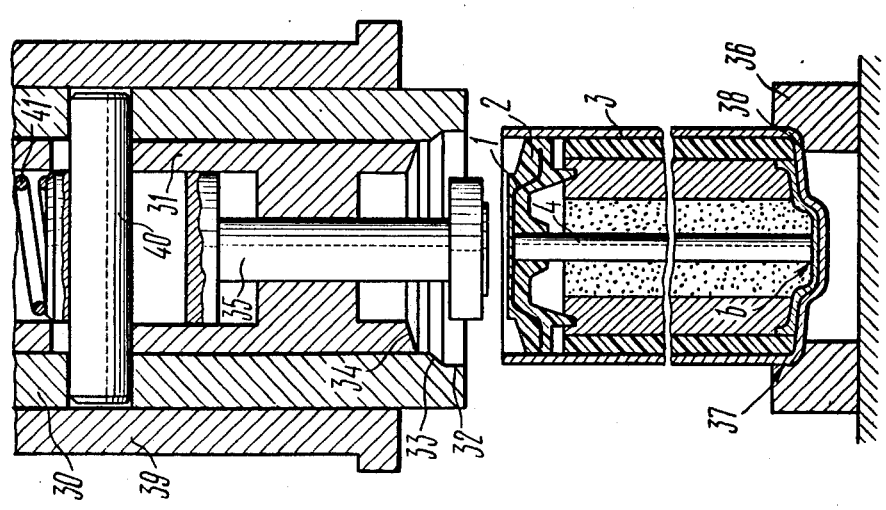
FIG. 5 is a cross sectional view of another embodiment of the device for sealing current sources, wherein the rolling die is built-up, according to the invention, said device being in the initial position.
Figure 8:
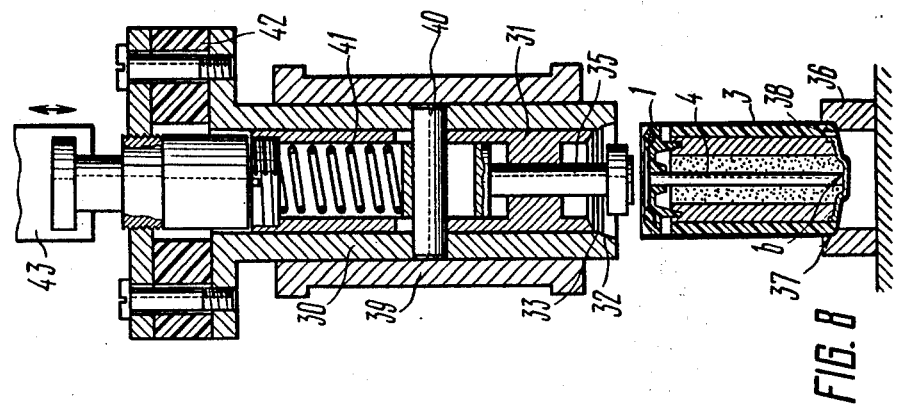
FIG. 8 is an embodiment of the device of FIG. 5, wherein the outer and inner dies are interconnected, according to the invention, by an elastic damper.

FIG. 1 illustrates the amount $\alpha$ of the possible displacement of the bearing point "b" of the current leadout 4 with the cover 1 being spaced at the distance "a".

Thereafter the rolling die 6, which has a cone-shaped portion with a sealing section whose diameter d must be equal to the diameter of a squeezed neck of the cell jar 3 in the plane of the end face of the cover 1, is moved along the axis of the jar 3 to the stop 5. This results in aligning the plane of the sealing portion having the diameter d with the plane of the end face of the cover 1. The portion of the jar 3 at the cover 1 is squeezed down to the diameter d of the sealing portion of the die 6, whereby the sealing gasket 2 is forced to the end face of the cover 1, thus providing a required squeezing of the sealing gasket 2. For a sealing gasket made of a linear polyethylene the squeezing percentage meeting the prescribed requirements is about 30.

The allowances for the cell component parts can also be compensated for by displacing another bearing point "c" of the current leadout 4. In this case, the displacement of the bearing point "c" over a distance "$\gamma$" provides that the setting and fixing of the cover 1 at a distance "a" from the positive stop 5 occurs owing to the deformation of the central portion of the cover 1 having a depression for the purpose.

The method for sealing current sources described hereinabove is successfully effected with the help of the device illustrated in FIGS. 2 and 3.

Said device comprises a rolling die 7 (FIG. 2), a hold-down member 8 with a spring 9, which is adapted to position the end face of the cell cover 1 perpendicular to its axis and to press the cover 1 towards the cell central support i.e., to the current leadout 4, and a footstep 10 for setting and supporting the cell in the process of sealing. The footstep comprises a cylindrical socket 11 and a ring projection 12. The rolling die 7 comprises a cone-shaped portion 13, the angle $\beta$ at the cone vertex being within the range of $10\pm5°$, a sealing portion having the diameter d, a rolling portion 14, a limiting platform 15 and a stop 16 to restrict the movement of the hold-down member 8 into the die 7.

The device operates as follows.

The item to be sealed, i.e., an alkali voltaic cell, is placed into the cylindrical socket 11 of the footstep 10 in such a way that the cell jar 3 rests against the ring projection 12.

When the rolling die 7 moves towards the item to be sealed the following steps are successively performed:

(1) setting the cover 1 and the sealing gasket 2 perpendicular to the axis of the cell jar 3 by the hold-down member 8 provided with a dielectric insert 17;

(2) gradually squeezing the sealing gasket 2 by the cone-shaped portion 13 of the die 7; and (3) beading of the edge of the jar 3 by the rolling portion 14 of the die 7.

At the moment of completing the process of sealing the cell, i.e., when the die 7 touches the stop 16, the hold-down member 8 aligns with the limiting platform 15 and displaces the bearing point "b" of the current leadout 4, thus deflecting the bottom of the cell jar 3.

As a result, the sealing portion of the die 7 having the diameter d coincides with the plane of the end face of the cover 1 because the distance between the cover 1 and the stop 16, the distance "k" in this particular case, remains constant.

If the amount of deflection of the bottom of the cell jar 3 is to be limited, a stop 18 is provided at the center of the footstep 10 (FIG. 3).

FIG. 4 illustrates another embodiment of the device for sealing current sources with a tube-type current leadout according to the method described above.

The disclosed device comprises a rolling die 19, which has a cone-shaped portion 20 with a sealing portion of a diameter d, and a rolling portion 21. Located at the center of the die 19 is a hold-down member 22 adapted to fix the cell cover 1. Located at the center of the hold-down member 22 is an insert 23 made of dielectric material. The cell jar 3 is positioned in a sleeve 24 into which a footstep 25, whose shape is similar to that of the lower portion of the cell being rolled, extends. The footstep 25 comprises a mechanism for displacing it along the axis of the device so as to bring the plane of the end face of the cover in coincidence with the sealing portion of the rolling die 19 having the diameter d. Said mechanism of the present embodiment is made as a wedge 26 positioned between the footstep 25 and a supporting platform 27 and moved by a spring 28. The footstep 25 moves in the sleeve 24 along the axis thereof in response to the movement of the wedge 26.

An air cylinder or any other similar actuator may be used as a mechanism for moving the footstep 25.

The device operates as follows.

The item to be sealed, i.e., a cell, is positioned into the sleeve 24 on the footstep 25; the wedge 26 moves in response to the force of the spring 28 and exerts pressure upon the footstep 25 which presses the cell cover 1 through the current leadout 4 to the stationary hold-down member 22.

From the moment the wedge 26 starts moving to the completion of the sealing process, the hold-down member 22 is located at a distance "b" from a supporting platform 29 of the die 19; and $B = A - C$, where $A = A_1$ is the distance from the plane of the sealing portion with the diameter d to the bearing face of the die 19 and C is the distance from the plane of the end face of the cover 1 to its upper portion, which is the height of the cover in the present embodiment.

When the cover 1 is pressed to the hold-down member 22 with the force developed by the spring 28, the plane of the end face of the cover 1 is set at a distance A from the supporting platform 29, i.e., in the plane of the sealing portion having the diameter d of the cone-shaped portion 20 of the die 19 pressed to the supporting platform 29. A constant position of the cell cover 1 at a distance A from the supporting platform 29, irrespective of the allowances of the component parts, provides an invariable squeezing factor for the gasket 2 held between the cell jar 3 and the cell cover 1.

After the cell cover 1 has been pressed to the hold-down member 22, the die 19 moves along the axis of the device to seal the cell.

When the die 19 reaches the supporting platform 29 the sealing portion of the diameter d of the cone-shaped portion 20 of the die 19 comes in coincidence with the plane of the end face of the cover 1 after having squeezed the sealing gasket 2 to the required degree, while the rolling portion 21 of the die 19 rolls in the edge of the cell jar 3.

The devices described above are used for sealing alkali cylinder-shaped current sources. Under the conditions of mass production such devices provide a stable and quality sealing of cells whose jars have been preliminarily annealed to remove cold deformation resulting from their production by the cold extrusion method.

However, the devices disclosed above are not suitable for sealing cells without preliminarily annealing their jars because considerable cold deformation of the material results in corrugations being formed on the cell jar edge through which the alkali solution leaks out from the cell and the atmospheric oxygen and moisture penetrate into the inside of the cell and ruin it.

FIGS. 5, 6, 7 and 8 illustrate an embodiment of the device which enable current sources to be sealed without resorting to heat treatment of their jars to remove cold deformation.

Figure 7:
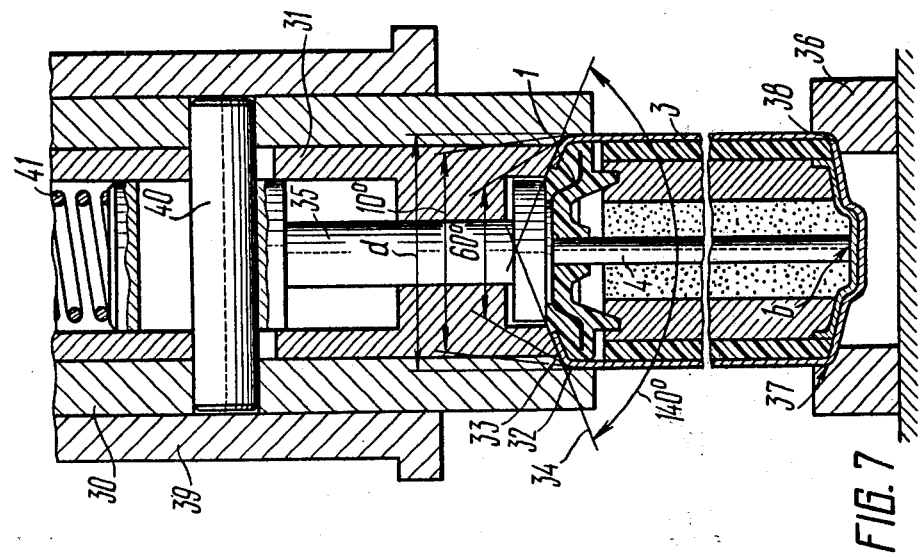
FIG. 7 is a device of FIG. 5 showing the final sealing of the cell.

In said device, the rolling die is a composite one comprising coaxially arranged outer 30 (FIG. 5) and inner 31 dies. The outer die 30 comprises two cone-shaped portions 32 and 33, the portion 32 being disposed at the outer die's end face (behind its starting portion) on the side of the cell to be sealed and having an angle at the cone vertex of about $10\pm5°$ (FIG. 6), the other cone-shaped portion 33 having an angle at the cone vertex of about $60\pm5°$. The inner die 31 has a cone-shaped portion 34 with an angle at its cone vertex of about $140\pm10°$ (FIG. 7).

The device also contains a hold-down member 35, a footstep 36 with a cylindrical socket 37 and a ring projection 38, a die housing 39, a stop pin 40 and a spring 41.

The outer die 30 and the inner die 31 can be actuated separately, e.g., from two controlled pushrods (not shown in FIGS. 5-7), or from a common drive.

The former being the case, to control the outer die 30 and the inner die 31, fitted therebetween is an elastic damper 42 (FIG. 8), such as rubber one.

The device operates as follows.

An assembled cell is positioned in the footstep 36 having the cylindrical socket 37 with the ring projection 38. Actuated by a rod 43 of the hydraulic cylinder (not shown in FIG. 8) the outer die 30 and the inner die 31 connected by the damper 42 start moving towards the cell to be sealed (downward as in FIG. 8), and the following steps are performed:
(1) alignment of the cell cover 1 by the hold-down member 35 and pressing it to the current leadout 4 in response to the force of the spring 41;
(2) preliminary rolling of the cell jar by the outer die 30 due to the force of the damper 42, when the hold-down member 35 touches the stop pin 40 rigidly connected to the outer die 30, it displaces the bearing point "b" of the current leadout 4 thus deflecting the bottom of the cell jar 3, the sealing portion of the die 30 coming in coincidence with the plane of the cell cover 1;
(3) stopping of the outer die 30 when it touches the die housing 39; and
(4) final sealing which is performed by the movement of the inner die 31 till it rests against the stop pin 40, the elastic damper being deformed as a result.

Such an embodiment of the device, wherein the process of sealing is performed in succession, first by the outer die and then by the inner die, simplifies the process of cell production, when cell jars are not annealed to remove the cold deformation, because the cell is rolled twice due to the provision of several cone-shaped portions in the die. During the process of sealing the outer die 30 performs squeezing and preliminary deformation of the cell jar edge, and the inner die 31 performs the final rolling to the required extent.

We claim:

1. A device for sealing current sources, said current sources consisting of a cell with a cover, comprising a hold-down member to position the plane of an end face of the cell cover perpendicular to an axis of the cell and to press it toward a central support; a footstep, for positioning and supporting the cell during its sealing, having a shape corresponding to that of a supporting part of the cell; a means to move said footstep along the axis of said cell until said cover of the cell rests against said hold-down member; a rolling die having a cone-shaped portion with an angle at the cone vertex of about 10±5° and a stop limiting the movement of said die.

2. A device according to claim 1, wherein said means for moving said footstep along the axis of the cell is a wedge with a spring.

3. A device for sealing current sources according to claim 1, wherein said rolling die is a composite of coaxially arranged inner and outer dies, said outer die having two cone-shaped portions, one of them being disposed at the end of said outer die behind its starting portion and having an angle at the cone vertex of about 10±5°, and the other one having an angle at the cone vertex at about 60±5°, said inner die having a cone-shaped portion with an angle at the cone vertex of about 140±10°.

4. A device according to claim 3 wherein said outer and inner dies are interconnected by an elastic damper.

5. A device according to claim 1, further comprising a sleeve into which the cell is placed and into which the footstep extends.

6. A device according to claim 2, further comprising a sleeve into which the cell is placed and into which the footstep extends.

7. A device according to claim 1, wherein said means for moving said footstep along the axis of the cell is a pneumatic drive.

8. A device according to claim 7, further comprising a sleeve into which the cell is placed and into which the footstep extends.

* * * * *